United States Patent
Block et al.

[15] 3,687,957
[45] Aug. 29, 1972

[54] 1-OXYGENATED-6-ACYL-1,2,3,4,5,6-HEXAHYDRO-2,6-METHANO-3-BENZAZOCINES

[72] Inventors: Fred B. Block, Burkewood Road, Hartsdale, N.Y. 10530; Arthur H. Schroder, 790 Bronx River Road, Bronxville, N.Y. 10708

[22] Filed: March 11, 1971

[21] Appl. No.: 123,407

[52] U.S. Cl..............................260/293.54, 424/267
[51] Int. Cl..............................................C07d 39/00
[58] Field of Search..................260/293.54, DIG. 13

[56] References Cited

UNITED STATES PATENTS 3,639,407  2/1972  Clarke et al.........260/293.54

*Primary Examiner*—Henry R. Jiles
*Assistant Examiner*—G. Thomas
*Attorney*—Karl F. Jorda

[57] ABSTRACT

1,2,3,4,5,6-Hexahydro-2,6-methano-3-benzazocines characterized by the presence of an alkanoyl or benzoyl group in the 6-position and a hydroxy or oxo group in the 1-position are analgesic agents and are prepared by treating the corresponding 1$\beta$-hydroxy-6-cyano compound with a Grignard-type reagent. Typical embodiments are 1$\beta$-hydroxy-3-methyl-6-acetyl-1,2,3,4,5,6-hexahydro-2,6-methano-3-benzazocine and 3,11$\beta$-dimethyl-6-propionyl-1$\beta$-hydroxy-8-methoxy-1,2,3,4,5,6-hexahydro-2,6-methano-3-benzazocines.

20 Claims, No Drawings

1-OXYGENATED-6-ACYL-1,2,3,4,5,6-HEXAHYDRO-2,6-METHANO-3-BENZAZOCINES

DETAILED DESCRIPTION

This invention pertains to a class of organic compounds which can be diagrammatically depicted by the following structural formula:

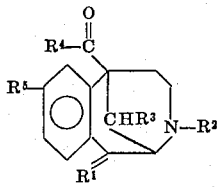

wherein $R^1$ is oxygen, [α-hydrogen,β-hydroxy], or [α-hydrogen,
β-(lower)alkanoyloxy];
$R^2$ is hydrogen, methyl or dimethylallyl
$R^3$ is hydrogen or methyl;
$R^4$ is (lower) alkyl or phenyl; and
$R^5$ is hydrogen, hydroxy, (lower)alkoxy, or (lower)alkanoyloxy.

In addition the present invention pertains to the pharmaceutically acceptable non-toxic acid addition salts of the above compounds, to methods and compositions for pharmaceutical uses of these compounds and their salts, and to processes and chemical intermediates employed in their preparation.

By the term "(lower)alkanoyl" is intended the acyl radical of straight and branched chain alkanoic acids having from 2 to 6 carbon atoms.

By the term "(lower)alkoxy" is intended a monovalent branched or straight hydrocarbon chain containing from 1 to 6 carbon atoms and joined through an oxygen ether bond, such as methoxy, ethoxy, isopropoxy, butoxy and the like.

These compounds are prepared by treatment of a 1β-hydroxy-6-cyano compound of Formula II with a Grignard-type reagent, especially alkyllithium or phenyllithium, with subsequent oxidation, if desired, of the resulting 1β-hydroxy-6-acylbenzazocine to the corresponding 1-oxo compound. This transformation can be represented as follows:

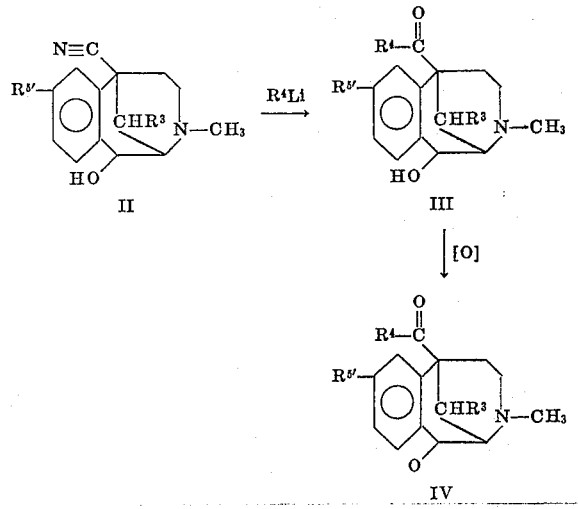

In the foregoing, $R^{5'}$ is hydrogen or (lower)alkoxy and $R^3$ and $R^4$ are as previously defined. The compounds of Formula I where $R^5$ is hydroxy are obtained by cleavage of a compound of Formula IV where $R^{5'}$ is alkoxy, preferably methoxy, with a hydrohalic acid such as hydrobromic or hydriodic acid, with subsequent optional reduction of the keto group in the 1-position to yield the 1β,8-dihydroxy compound.

The compounds of Formula I wherein $R^2$ is hydrogen are obtained through the action of cyanogen bromide followed by treatment with acid.

The compounds of the present invention exist as optical isomers and both the racemate of these isomers and the individual isomers themselves are within the scope of the present invention. The racemate can be separated into its individual isomers through the well-known technique of formation of diastereoisomeric salts with optically active acids, such as d- or l-tartaric acid. Alternatively, the individual isomers of the starting materials of Formula II can be obtained through resolution of the racemic starting materials and these isomers then subjected to the described procedures to yield the corresponding isomeric final compounds.

The starting materials of Formula II are obtained through cyclization of a quaternary salt of a 1-oxo-4-cyano-4-(2-dimethylaminoethyl)-1,2,3,4-tetrahydronaphthylene in the presence of base followed by conversion to the free base.

One important embodiment of the present invention, particularly for preparing solid pharmaceutical formulations is the pharmaceutically acceptable non-toxic acid addition salts of these 1-oxo and 1-hydroxy-6-acyl-1,2,3,4,5,6-hexahydro-2,6-methano-3-benzazocines. Such pharmaceutically acceptable non-toxic salts include those derived from both organic and inorganic acids such as, without limitation, hydrochloric, hydrobromic, sulfuric, phosphoric, methanesulfonic, acetic, lactic, succinic, malic, maleic, aconitic, phthalic, tartaric, embonic, enanthic and like acids.

The compounds defined by Formula I are analgesic agents and thus useful in the alleviation of pain. As with any analgesic agent the dose must be individually titrated to the recipient, taking into consideration the severity of the pain, his overall physical condition and age, and the response observed. In recognized pharmacological tests, such as, the tail flick test, the phenylquinone writhing test and the acetic acid stretch test, analgesic activity can generically be observed at levels from 0.5 to 20 mg/kg.

The 1-oxo and 1-hydroxy-6-acyl-1,2,3,4,5,6-hexahydro-2,6-methano-3-benzazocines of the present invention are administered parenterally or orally to achieve an analgesic effect, in any of the usual pharmaceutical forms. These include solid and liquid unit oral dosage forms such as tablets, capsules, powders, suspensions, solutions, syrups and the like, including sustained release preparations, and fluid injectable forms such as sterile solutions and suspensions The term dosage form as used in this specification and the claims refer to physically discrete units to be administered in single or multiple dosage to animals, each unit containing a predetermined quantity of active material in association with the required diluent, carrier or vehicle. The quantity of active material is that calculated to produce the desired therapeutic effect upon administration of one or more of such units.

Powders are prepared by comminuting the 1-oxo and 1-hydroxy-6-acyl-1,2,3,4,5,6-hexahydro-2,6-methano-3-benzazocines to a suitable fine size and mixing with a similarly comminuted diluent pharmaceutical carrier such as an edible carbohydrate material as for example, starch. Sweetening, flavoring, preservative, dispersing and coloring agents can also be present.

Capsules are made by preparing a powder mixture as described above and filling formed gelatin sheaths. A lubricant such as talc, magnesium stearate and calcium stearate can be added to the powder mixture as an adjuvant before the filling operation; a glidant such as colloidal silica may be added to improve flow properties; a disintegrating or solubilizing agent may be added to improve the availability of the medicament when the capsule is ingested.

Tablets are made by preparing a powder mixture, granulating or slugging, adding a lubricant and disintegrant and pressing into tablets. A powder mixture is prepared by mixing the compound, suitably comminuted, with a diluent or base such as starch, sucrose, kaolin, dicalcium phosphate and the like. The powder mixture can be granulated by wetting with a binder such as syrup, starch paste, acacia mucilage or solutions of cellulosic or polymeric materials and forcing through a screen. As an alternative to granulating, the powder mixture can be run through the tablet machine and the resulting imperfectly formed slugs broken into granules. The granules can be lubricated to prevent sticking to the tablet forming dies by means of the addition of stearic acid, a stearate salt, talc or mineral oil. The lubricated mixture is then compressed into tablets. The medicaments can also be combined with free flowing inert carriers and compressed into tablets directly without going through the granulating or slugging steps. A protective coating consisting of a sealing coat of shellac, a coating of sugar or polymeric material and a polish coating of wax can be provided. Dyestuffs can be added to these coatings to distinguish different unit dosages.

Oral fluids such as syrups and elixirs can be prepared in unit dosage form so that a given quantity, e.g., a teaspoonful, contains a predetermined amount of the compound. Syrups can be prepared by dissolving the compound in a suitably flavored aqueous sucrose solution while elixirs are prepared through the use of a nontoxic alcoholic vehicle. Suspensions can be formulated by dispersing the compound in a non-toxic vehicle in which it is insoluble.

Fluid unit dosage forms for parenteral administration can be prepared by suspending or dissolving a measured amount of the compound in a non-toxic liquid vehicle suitable for injection such as an aqueous or oleaginous medium and sterilizing the suspension or solution. Alternatively a measured amount of the compound is placed in a vial and the vial and its contents are sterilized and sealed. An accompanying vial or vehicle can be provided for mixing prior to administration.

The following examples set forth the manner and process of making typical embodiments of the invention, without being a limitation thereof, and include the best mode contemplated for carrying out the invention.

PREPARATION

A. To a slurry of 39.4 g of powdered potassium hydroxide, 7.0 ml of water and 100 ml of benzene are added 101.0 g of 2-chloro-N,N-dimethylethylamine hydrochloride and 50 ml of benzene with rapid stirring. After thirty minutes, the benzene layer is separated and dried over magnesium sulfate.

Simultaneously, a slurry of 16.4 g of 58.6% sodium hydride (0.4 M) in 80 ml of dimethylsulfoxide is heated under nitrogen for one hour at 60° C. The mixture is cooled and 58.8 g of m-methoxybenzyl nitrile (0.4 M) are added dropwise over fifteen minutes. The solution is re-cooled and the dried benzene solution is added dropwise, maintaining the temperature below 40° C. The resultant solution is then heated at 80° C for 1 hour, cooled and cautiously treated with 500 ml of water. The aqueous layer is separated and extracted with benzene, these extracts being combined with the initial benzene phase, which is then extracted with 1N hydrochloric acid. These acidic extracts are rendered basic with 2N sodium hydroxide and extracted with ether to yield a yellow oil which is distilled at 119°–122° C/0.03 mm to yield α-(2-dimethylamino ethyl)-3-methoxyphenylaceto-nitrile.

To a stirred solution of 545 g of this nitrile in 1200 ml of benzene are added 22.0 g of sodium methoxide. The resultant slurry is stirred one hour, after which time 216.0 g (2.5 M) of methyl acrylate in 150 ml of benzene are added at such a rate as to maintain the termperature between 25° and 30° C.

After stirring overnight, the mixture is poured into 1,400 ml of water and extracted with ether to yield, upon drying and evaporation, methyl 4-cyano-6-dimethylamino-4-(3-methoxyphenyl)hexanoate.

To a stirred solution of 35 g of potassium hydroxide in 200 ml of methanol are added 190 g of this ester in 200 ml of methanol at such a rate as to maintain the temperature below 15° C. Stirring is continued for 5 hours, after which time the mixture is concentrated to dryness. The residual material is slurried several times with toluene and concentrated to dryness to remove traces of methanol. The residue is treated with water and again concentrated to dryness. The resultant material is dissolved in water and washed with ether (recovering starting amine) and the aqueous phase is rendered acidic with concentrated hydrochloric acid and evaporated to dryness. Trituration with acetone precipitates potassium chloride, which is removed by filtration. Evaporation of the filtrate yields the product as an oil which crystallizes upon addition of acetone. Recrystallization from isopropanol then produces 4-cyano-4-(3-methoxyphenyl)-6-dimethylaminohexanoic acid, m.p. 181°–183° C.

B. A mixture of 3.26 g of 4-cyano-4-(3-methoxyphenyl)-6-dimethylaminohexanoic acid and 15.0 ml of thionyl chloride are heated at reflux for thirty minutes. The resultant solution is concentrated to dryness and treated once with ethylene dichloride followed by evaporation to remove excess thionyl chloride. The resultant red viscous material is dissolved in 8.0 ml of ethylene dichloride with heating, cooled slightly, and treated with 10.0 ml of carbon disulfide, maintaining a temperature of approximately 30° C. As the mixture is cooled, an insoluble gummy material begins to form, at which time 4.4 g of aluminum chloride is mmediately added. Sufficient cooling should be present since a violent exotherm ensues as the aluminum chloride is added.

The reaction mixture is heated to reflux for fifteen minutes, cooled and the reddish mother liquor decanted to leave an insoluble complex. The decanted residue is dissolved in water and washed with ether. The resultant aqueous phase is rendered basic with concentrated ammonium hydroxide and extracted with ether to yield an oil upon evaporation. This oil is dissolved in acetone and rendered acidic with 30% hydrogen bromide in acetic acid The precipitated product is collected by filtration and recrystallized from methanol to yield 1-oxo-4-cyano-4-(2-dimethylaminoethyl)-6-methoxy-1,2,3,4,-tetrahydro-napthalene hydrobromide, m.p. 236°–238° C.

In a similar fashion is obtained 1-oxo-4-cyano-4-(2-dimethylaminoethyl)-1,2,3,4-tetrahydronapta-lene hydrobromide, m.p. 219°.

C. To a refluxing solution of 3.54 g (0.01M) of 1-oxo-4-cyano-4-(2-dimethylaminoethyl)-6-methoxy-1,2,3,4-tetrahydronaphthalene hydrobromide and 20 ml of acetic acid is added, over 15 minutes, 1.76 g (0.011M) of bromine in 9 ml of acetic acid. The solution is heated at reflux for an additional 15 minutes, cooled, and then concentrated to dryness. Trituration of the residue with acetone yields crude 1-oxo-2-bromo-4-cyano-4-(2-dimethylaminoethyl)6-methoxy-1,2,3,4-tetrahydronaphthalene hydrobromide, m.p. 205°–10b$L$ C.

To a well stirred suspension of 3.25 g (7.5mMole) of this hydrobromide and 12.0 ml of water is added dropwise 1.30 ml of concentrated ammonium hydroxide with cooling. After stirring for 1 hour, the slurry is filtered to yield 1-oxo-3-methyl-6-cyano-8-methoxy-1,2,3,4,5,6-hexahydro-2,6-methano-3-benzazocine methobromide, m.p. 245°–250° C. Additional product is isolated by concentrating the mother liquor to dryness and triturating with a mixture of ethanol-acetone.

A suspension of 9.0 ml of 1-nonanol and 1.75 g (5 mMole) of this methobromide is immersed in a bath preheated to 240° C. After refluxing 30 minutes, the solution is cooled and diluted with ether. The solid which forms is collected and recrystallized from tetrahydrofuran to yield 1-oxo-3-methyl-6-cyano-8-methoxy-1,2,3,4,5,6-hexahydro-2,6-methano-3-benzazocine, m.p. 163°–165° C.

Similarly obtained is 1-oxo-3-methyl-6-cyano-1,2,3,4,5,6-hexahydro-2,6-methano-3-benzazocine, m.p. 102°–103° C.

D. To 8.0 g (31.2 mM) of 1-oxo-3-methyl-6-cyano-8-methoxy-1,2,3,4,5,6-hexahydro-2,6-methano-3-benzazocine in 300 ml methanol is added 1.8 g of sodium borohydride which results in gas evolution and a slight exotherm. The solution is stirred at room temperature for four hours. The methanol is then removed under vacuum and the residue is dissolved in 1:1 chloroform:ether. The organic phase is washed with water until the washings are neutral, dried, and evaporated to dryness to yield an oil. The oil is slurried in 100 ml of cyclohexane and scratched. Immediate crystallization should occur. The resultant solid is separated, dried and recrystallized from isopropanol to yield 1$\beta$-hydroxy-3-methyl-6-cyano-8-methoxy-1,2,3,4,5,6-hexahydro-2,6-methano-3-benzazocine, m.p. 117°–120° C.

Similarly obtained is 1$\beta$-hydroxy-3-methyl-6-cyano-1,2,3,4,5,6-hexahydro-2,6-methano-3-benzazocine, m.p. 114° C.

By following similar procedures to those herein described, but utilizing methyl crotonate in place of methyl acrylate in part (A) there is obtained 1$\beta$-hydroxy-3,11$\beta$-dimethyl-6-cyano-8-methoxy-1,2,3,4,5,6-hexahydro-2,6-methano-3-benzazocine, m.p. 252°–254° C as the hydrochloride salt.

EXAMPLE 1

To a solution of 20.0 g of 1$\beta$-hydroxy-3-methyl-6-cyano-1,2,3,4,5,6-hexahydro-2,6-methano-3-benzazocine in 250 ml of dry tetrahydrofuran under a nitrogen atmosphere are added dropwise with external cooling, 120 ml of a 1.62 molar ethereal methyllithium solution. One hundred and fifty milliliters of tetrahydrofuran are then added and the mixture is heated with distillation of the solvent until an internal temperature of 66° C is attained. During this time approximately 170 ml of solvent are obtained. The mixture is then heated at reflux under nitrogen for 3 hours, cooled and treated with concentrated hydrochloric acid until foaming ceases. The remaining solvent is removed by evaporation and the residue is treated with 300 ml of 2N hydrochloric acid and heated at reflux for 30 minutes. The reaction mixture is then cooled, rendered basic and extracted with ether. The ethereal extracts are dried and evaporated and the residual oil is treated with 50 ml of ether. The solid remaining is collected and recrystallized from cyclohexane to yield 1$\beta$-hydroxy-3-methyl-6-acetyl-1,2,3,4,5,6-hexahydro-2,6-methano-3-benzazocine, m.p. 98.0°–99.5° C. A typical carbon-hydrogen analysis is as follows:

Calc. $C_{15}H_{19}NO_2$    C, 73.44;   H, 7.81;   N, 5.71.
Found:                      73.18;     7.51;    5.75.

By utilizing the individual d- and l-isomers of the starting compound, the corresponding d- and l-isomers of the final compound are obtained, m.p.'s = 110°–112° C; optical rotation as follows:

| $\lambda$ $[\alpha]_{25°}$ | d (c=1.04) | l (c=1.05) |
|---|---|---|
| 589 $\mu$ | +107° | −105° |
| 578 | +111 | −111 |
| 546 | +130 | −129 |
| 436 | +268 | −261 |
| 365 | +594 | −577 |

Similarly obtained is 3,11$\beta$-dimethyl-6-propionyl-1$\beta$-hydroxy-8-methoxy-1,2,3,4,5,6-hexahydro-2,6-methano-3-benzazocine.

By utilizing an equivalent amount of 1$\beta$-hydroxy-3-methyl-6-cyano-8-methoxy-1,2,3,4,5,6-hexahydro-2,6-methano-3-benzazocine in the foregoing procedure, there is likewise obtained 1$\beta$-hydroxy-3-methyl-6-acetyl-8-methoxy-1,2,3,4,5,6-hexahydro-2,6-methano-3-benzazocine, m.p. 118°–120° C.

EXAMPLE 2

To 3.50 g of 1$\beta$-hydroxy-3-methyl-6-cyano-1,2,3,4,5,6-hexahydro-2,6-methano-3-benzazocine in 150 ml of dry tetrahydrofuran under a nitrogen atmosphere are added 42.3 ml of a 0.8 molar ethereal ethyllithium solution. The mixture is refluxed under a nitrogen atmosphere for 3 hours. The cooled mixture is rendered acidic with 2N hydrochloric acid and refluxed for 15 minutes. The tetrahydrofuran is removed under vacuum and the residue is diluted with water. The aqueous mixture is rendered basic with ammonium hydroxide and extracted with chloroform. The chloroform extracts are washed with water and dried over magnesium sulfate. The drying agent is removed by filtration and the chloroform is evaporated to yield and oil which crystallizes. The solid is collected and recrystallized several times from cyclohexane to yield 1β-hydroxy-3-methyl-6-propionyl-1,2,3,4,5,6-hexahydro-2,6-methano-3-benzazocine, m.p. 118°–120° C.

In a similar fashion, utilizing an equivalent amount of 1β-hydroxy-3-methyl-6-cyano-8-methoxy-1,2,3,4,5,6-hexahydro-2,6-methano-3-benzazocine, there is obtained 1β-hydroxy-3-methyl-6-propionyl-8-methoxy-1,2,3,4,5,6-hexahydro-2,6-methano-3-benzazocine, m.p. 143°–145° C.

EXAMPLE 3

1β-Hydroxy-3-methyl-6-cyano-1,2,3,4,5,6-hexahydro-2,6-methano-3-benzazocine is treated in the manner described in Examples 1 and 2 with (a) isopropyl-lithium, (b) n-butyllithium and (C) phenyllithium to respectively yield a. 1β-Hydroxy-3-methyl-6-(2-methylpropionyl)-1,2,3,4,5,6-hexahydro-2,6-methano-3-benzazocine, m.p. 258–259° C;

b. 1β-hydroxy-3-methyl-6-pentanoyl-1,2,3,4,5,6-hexahydro-2,6-methano-3-benzazocine, m.p. as the hydro-bromide salt 191–193° C; and c. 1β-hydroxy-3-methyl-6-benzoyl-1,2,3,4,5,6-hexahydro-2,6-methano-3-benzazocine, m.p. 152°–153° C

EXAMPLE 4

A solution of 1.75 g (7.14 mM) OF 1β-hydroxy-3-methyl-6-acetyl-1,2,3,4,5,6-hexahydro-2,6-methano-3-benzazocine in 35 ml of acetic anhydride is allowed to stand at room temperature for 2 days. The excess acetic anhydride is then removed under vacuum and the residue is treated with water. The pH is adjusted to 9 with dilute base and a white solid immediately precipitates. The solid is collected by filtration, dried and recrystallized from isopropanol to yield 1β-acetoxy-3-methyl-6-acetyl-1,2,3,4,5,6-hexahydro-2,6-methano-3-benzazocine, m.p. 142°–143°C.

In a similar fashion are obtained 1βacetoxy-3-methyl-6-propionyl-1,2,3,4,5,6-hexahydro-2,6-methano-3-benzazocine, m.p. 133°–134° C and 1β-acetoxy-3-methyl-6-propionyl-8-methoxy-1,2,3,4,5,6-hexahydro-2,6-methano-3-benzazocine, m.p. 146°–148° C.

EXAMPLE 5

A solution of 0.45 g of 1β-acetoxy-3-methyl-6-propionyl-1,2,3,4,5,6,6-hexahydro-2,6-methano-3-benzazocine in 60 ml of chloroform is added dropwise to a mixture of 0.19 g of cyanogen bromide in 80 ml of chloroform. The mixture is stirred for 1 hour at room temperature and then for 4 hours at reflux. The solvent is then removed by evaporation under vacuum and the residue is taken up in chloroform. The solution is washed with 2N hydrochloric acid and dried over sodium sulfate. Upon evaporation of the dried solution, there is obtained 1β-acetyl-3-cyano-6-propionyl-1,2,3,4,5,6,-hexahydro-2,6-methano-3-benzazocine which can be used in the following step without further purification.

A mixture of 0.31 g of this cyano compound, 30 ml of ethanol and 50 ml of 2N hydrochloric acid is refluxed for 4 hours. The solvent is then removed by evaporation and the residue is rendered basic with ammonium hydroxide and extracted with chloroform. These extracts are dried and evaporated to yield an oil which is heated at reflux with 50 ml of 2N hydrochloric acid for 3 hours. The reaction product is cooled, washed with chloroform, rendered basic with ammonium hydroxide and extracted with chloroform. Evaporation of these extracts yields 1β-hydroxy-6-propionyl-1,2,3,4,5,6-hexahydro-2,6-methano-3-benzazocine as an oil.

EXAMPLE 6

1β-Hydroxy-3-methyl-6-propionyl-8-methoxy-1,2,3,4,5,6-hexahydro-2,6-methano-3-benzazocine is treated with chromium trioxide-sulfuric acid reagent for 15 minutes. Upon neutralization and extraction with chloroform, there is obtained 1-oxo-3-methyl-6-propionyl-8-methoxy-1,2,3,4,5,6-hexahydro-2,6-methano-3-benzazocine, m.p. 134°–136° C.

In a similar fashion 1β-hydroxy-6-propionyl-1,2,3,4,5,6-hexahydro-2,6-methano-3-benzazocine is converted to 1-oxo-6-propionyl-1,2,3,4,5,6-hexahydro-2,6-methano-3-benzazocine, m.p. as the hydrochloride salt = 227°–229° C.

EXAMPLE 7

A mixture of 0.46 g of 1-oxo-3-methyl-6-propionyl-8-methoxy-1,2,3,4,5,6-hexahydro-2,6-methano-3-benzazocine and 12 ml of hydriodic acid are refluxed for 75 minutes. The mixture is poured into 15 ml of water and 15 ml of ammonium hydroxide and washed with the chloroform. The aqueous residue is reduced to one half its original volume and adjusted to pH 7. The solid which forms is collected and dried to yield 1-oxo-3-methyl-6-propionyl-8-hydroxy-1,2,3,4,5,6-hexahydro-2,6-methano-3-benzazocine, m.p. 230°–232° C.

EXAMPLE 8

To 1.05 g of 1-oxo-6-propionyl-1,2,3,4,5,6-hexahydro-2,6-methano-3-benzazocine (see Example 6) in 40 ml DMF was added 0.61 g of N,N-diisopropylethylamine an 0.71 g of 1-bromo-3-methyl-2-butene. The mixture was heated at 100° for 1 hour and stirred overnight at room temperature. DMF was removed under vacuum. The residue was taken up in ether an d the ether was washed with water. The ether was dried, evaporated, yielding 1.14 g of an oil. The oil was dissolved in 10 ml of IPA, made acidic with Et₂O/HC1, cooled and filtered. The solid was washed with Et₂O and dried, yielding 1.00 g (67%) of white solid m.p. 215°–218°.

EXAMPLE 9

The free base from 1.30 g of 1-oxo- 0-dimethyl-allyl-6-propionyl-1,2,3,4,5,6-hexahydro-2,6-methano-3-benzazocine was dissolved in 50 ml of abs. EtOh and was treated with 7.2 ml of NaBH$_4$/EtOH (calc. 0.52 mM) and dried at room temperature for 5 hours. The solvent was removed, and the residue dissolved in CHCl$_3$ and washed with water, dried and evaporated, yielding an oil. The residue was dissolved in 15 ml of EtOAc, made acidic with Et$_2$O/HCl and heated. After adding several drops of IPA, a precipitate formed. This was filtered and dried, yielding b 0.20 g (15%) of white solid, m.p. 197–200°.

What is claimed is:

1. 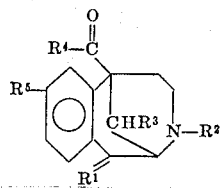

where R$^1$ is oxygen, [α-hydrogen,β-hydroxy], or [α-hydrogen,β-(lower)alkanoyloxy];
R$^2$ is hydrogen, methyl or dimethylallyl
R$^3$ is hydrogen or methyl;
R$^4$ is (lower)alkyl orphenyl; and
R$^5$ is hydrogen, hydroxy, (lower)alkoxy, or (lower)alkanoyloxy.

2. The pharmaceutically acceptable non-toxic acid addition salts of a compound according to claim 1.

3. A compound according to claim 1 wherein R$^1$ is [α-hydrogen,β-hydroxy], R$^2$ is methyl, R$^3$ is hydrogen and R$^5$ is hydrogen or methoxy.

4. The compound according to claim 1 which is 1β-hydroxy-3-methyl-6-acetyl-1,2,3,4,5,6-hexahydro-2,6-methano-3-benzazocine.

5. The compound according to claim 1 which is 1β-hydroxy-3-methyl-6-acetyl-8methoxy-1,2,3,4,5,6-hexahydro-2,6-methano-3-benzazocine.

6. The compound according to claim 1 which is 1β-hydroxy-3-methyl-6-propionyl-1,2,3,4,5,6-hexahydro-2,6-methano-3-benzazocine.

7. The compound according to claim 1 which is 1β-hydroxy-3-methyl-6-(2-methylpropionyl)-1,2,3,4,5,6-hexahydro-2,6-methano-3-benzazocine.

9. The compound according to claim 1 which is 1β-hydroxy-3-methyl-6-pentanoyl-1,2,3,4,5,6-hexahydro-2,6-methano-3-benzazocine.

10. The compound according to claim 1 which is 1β-hydroxy-3-methyl-6-benzoyl-1,2,3,4,5,6-hexahydro-2,6-methano-3-benzazocine.

11. The compound according to claim 1 which is 1β-acetoxy-3-methyl-6-acetyl-1,2,3,4,5,6-hexahydro-2,6-methano-3-benzazocine.

12. The compound according to claim 1 which is 1β-acetoxy-3-methyl-6-propionyl-1,2,3,4,5,6-hexahydro-2,6-methano-3-benzazocine.

13. The compound according to claim 1 which is 1β-acetoxy-3-methyl-6-propionyl-8-methoxy-1,2,3,4,5,6-hexahydro-2,6-methano-3-benzazocine.

14. The compound according to claim 1 which is 1β-hydroxy-6-propionyl-1,2,3,4,5,6-hexahydro-2,6-methano-3-benzazocine.

15. The compound according to claim 1 which is 1-oxo-3-methyl-6Propionyl-8-methoxy-1,2,3,4,5,6-hexahydro-2,6-methano-3-benzazocine.

16. The compound according to claim 1 which is 1-oxo-3-methyl-6-propionyl-1,2,3,4,5,6-hexahydro-2,6-methano-3-benzazocine.

17. The compound according to claim 1 which is 1-oxo-3-methyl-6propionyl-8-hydroxy-1,2,3,4,5,6-hexahydro-2,6-methano-3-benzazocine.

18. The compound according to claim 1 which is 1-oxo-3-dimethylallyl-6-propionyl-1,2,3,4,5,6-hexahydro-2,6-methano-3-benzazocine.

19. The compound according to claim 1 which is 1β-hydroxy-3-dimethylallyl-6-propionyl-1,2,3,4,5,6-hexahydro-2,6-methano-3-benzazocine.

20. The compound according to claim 1 which is 3,11β-dimethyl-6-propionyl-1β-hydroxy-8-methoxy-1,2,3,4,5,6-hexahydro-2,6-methano-3-benzazocine.

* * * * *

PO-1050
(5/69)

UNITED STATES PATENT OFFICE
CERTIFICATE OF CORRECTION

Patent No. 3,687,957    Dated August 29, 1972

Inventor(s) Fred B. Block et al

It is certified that error appears in the above-identified patent and that said Letters Patent are hereby corrected as shown below:

Column 9, above the structural formula insert --- 1. A compound of the formula ---.

Column 10, insert the following claim:

7. The compound according to claim 1 which is 1β-hydroxy-3-methyl-6-propionyl-8-methoxy-1,2,3,4,5,6-hexahydro-2,6-methano-3-benzazocine.

Column 10, line 1, delete "7" and substitute --- 8 ---.

Signed and sealed this 10th day of September 1974.

(SEAL)
Attest:

McCOY M. GIBSON, JR.
Attesting Officer

C. MARSHALL DANN
Commissioner of Patents aaa